United States Patent
Alavi et al.

(10) Patent No.: US 6,704,723 B1
(45) Date of Patent: Mar. 9, 2004

(54) METHOD AND SYSTEM FOR PROVIDING BUSINESS INTELLIGENCE INFORMATION OVER A COMPUTER NETWORK VIA EXTENSIBLE MARKUP LANGUAGE

(75) Inventors: Ali Alavi, Arlington, VA (US); Yuan Ding, Fairfax, VA (US); Benjamin Z. Li, Great Falls, VA (US); Abhimanyu Warikoo, New York, NY (US)

(73) Assignee: Microstrategy, Incorporated, McLean, VA (US)

( * ) Notice: Subject to any disclaimer, the term of this patent is extended or adjusted under 35 U.S.C. 154(b) by 189 days.

(21) Appl. No.: 09/884,471

(22) Filed: Jun. 20, 2001

(51) Int. Cl.⁷ .............................................. G06F 17/30
(52) U.S. Cl. ................................. 707/3; 707/4
(58) Field of Search .............................. 707/1, 2, 3, 4, 707/5, 6, 7, 8, 9, 10, 100, 101, 102, 104.1, 513, 514; 715/511

(56) References Cited

U.S. PATENT DOCUMENTS

| | | | |
|---|---|---|---|
| 4,688,195 A | 8/1987 | Thompson | 706/11 |
| 4,829,423 A | 5/1989 | Tennant | 704/8 |
| 5,197,005 A | 3/1993 | Shwartz | 707/2 |
| 5,276,870 A | 1/1994 | Shan | 707/2 |
| 5,418,943 A | 5/1995 | Borgida | 707/4 |
| 5,421,008 A | 5/1995 | Banning | 707/4 |
| 5,555,403 A | 9/1996 | Cambot | 707/4 |
| 5,557,773 A | 9/1996 | Wang | 707/3 |
| 5,584,024 A | 12/1996 | Shwartz | 707/4 |
| 5,664,182 A | 9/1997 | Nirenberg | 707/102 |
| 5,692,181 A | 11/1997 | Anand | 707/102 |
| 5,737,592 A | 4/1998 | Nguyen | 707/4 |
| 5,764,977 A | 6/1998 | Oulid-Aissa | 707/10 |
| 5,852,821 A | 12/1998 | Chen | 707/2 |
| 5,864,856 A | 1/1999 | Young | 707/100 |
| 5,890,151 A | 3/1999 | Agrawal | 707/5 |
| 5,890,167 A | 3/1999 | Bridge | 707/204 |
| 5,905,985 A | 5/1999 | Malloy | 707/100 |
| 5,914,878 A | 6/1999 | Yamamoto | 707/106 |
| 5,926,820 A | 7/1999 | Agrawal | 707/200 |
| 5,940,818 A | 8/1999 | Malloy | 707/2 |
| 5,943,668 A | 8/1999 | Malloy | 707/3 |
| 5,978,796 A | 11/1999 | Malloy | 707/3 |
| 5,983,228 A | 11/1999 | Kobayashi | 707/10 |
| 6,041,326 A | 3/2000 | Amro | 707/10 |
| 6,122,636 A | 9/2000 | Malloy | 707/202 |
| 6,154,766 A | 11/2000 | Yost | 709/201 |
| 6,247,008 B1 | 6/2001 | Cambot | 707/3 |
| 6,279,033 B1 | 8/2001 | Selvarajan | 709/217 |
| 6,408,292 B1 * | 6/2002 | Bakalash et al. | 707/2 |
| 6,424,979 B1 * | 7/2002 | Livingston et al. | 715/511 |

OTHER PUBLICATIONS

Robert C. Stern, Bruce M. Anderson and Craig W. Thompson, A Menu–Based Natural Language Interface To A Large Database, Texas Instruments Incorporated, P. O. Box 660246, MS 238, Dallas, Texas 75266, NAECON: National Aerospace & Electronics Conference, Dayton, Ohio, May 20–24, 1985.

(List continued on next page.)

Primary Examiner—Diane D. Mizrahi
Assistant Examiner—Yicun Wu
(74) Attorney, Agent, or Firm—Hunton & Williams LLP (57) ABSTRACT

A method and system is provided for exchanging information over a computer network. A network server computer system receives a query request from at least one client computer system over a computer network. The query request is formatted into an extensible markup language query document according to an extensible markup language document application program interface. The extensible markup language query document is transmitted to at least one business intelligence server computer system. The at least one business intelligence server computer system retrieves the information requested in the extensible markup language query document from at least one data storage device.

14 Claims, 7 Drawing Sheets

OTHER PUBLICATIONS

Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computational Linguistics, MIT, Jun., 1983, pp 151–158.

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Building Usable Menu–Based Natural Language Interfaces To Databases, Proceedings of the Ninth International Conference on Very Large Data Bases, Florence, Italy, Oct. 31–Nov, 2, 1983, pp 43–55.

Craig W. Thompson, John Kolts, and Kenneth W. Ross, A Toolkit for Building "Menu–Based Natural Language" Interfaces, Texas Instruments Incorporated, P. O. Box 226015, MS 238, Dallas, Texas 75265, 1985.

Craig Warren Thompson, M.A., B.A., Using Menu–Based Natural Language Understanding to Avoid Problems Associated with Traditional Natural Language Interfaces to Databases, Dissertation Presented to the Faculty of the Graduate School of The University of Texas at Austin, May 1984.

MicroStrategy Announces DSS Objects 5.0, ROLAP Industry's Only OLE API Provides a Universal Link for Organizations Seeking to Build Customized Decision Support Applications.

Business Objects User's Guide Version 5.1 (electronic copy on enclosed CD).

Getting Started with Business Object Version 5.1 (electronic copy on enclosed CD).

Business Objects Deployment Guide (electronic copy on enclosed CD).

Broadcast Agent 5.1 (electronic copy on enclosed CD).

Business Objects 5.1 (electronic copy on enclosed CD).

Web Intelligence 2.6 (electronic copy on enclosed CD).

Business Objects Designer's Guide Version 5.1 (electronic copy on enclosed CD).

Business Objects Error Message Guide Version 5.1 (electronic copy on enclosed CD).

Business Objects Generic ODBC Access Guide Version 5.1 (electronic copy on enclosed CD).

Business Objects Info View User's Guide (electronic copy on enclosed CD).

Business Objects Installation and Upgrade Guide (electronic copy on enclosed CD).

Business Objects MS Access Database Guide Version 5.1 (electronic copy on enclosed CD).

Business Objects MS SQL Server Database Guide Version 5.1 (electronic copy on enclosed CD).

Business Objections Supervisor's Guide Version 5.1 (electronic copy on enclosed CD).

Quick Start MicroStrategy Agent Version 6.0 (electronic copy on enclosed CD).

User Guide MicroStrategy Agent Version 6.0 (electronic copy on enclosed CD).

User Guide MicroStrategy Architect Version 6.0 (electronic copy on enclosed CD).

User Guide MicroStrategy Objects Version 6.0 (electronic copy on enclosed CD).

Excel Add–In MicroStrategy Objects Version 6.0 (electronic copy on enclosed CD).

User Guide MicroStrategy Intelligence Server Version 6.0 (electronic copy on enclosed CD).

User Guide MicroStrategy Administrator Version 6.0 (electronic copy on enclosed CD).

Administrator Guide MicroStrategy Administrator Version 6.5 (electronic copy on enclosed CD).

* cited by examiner

METHOD AND SYSTEM FOR PROVIDING BUSINESS INTELLIGENCE INFORMATION OVER A COMPUTER NETWORK VIA EXTENSIBLE MARKUP LANGUAGE

FIELD OF THE INVENTION

This invention relates generally to systems and methods for exchanging information over computer networks, including information derived from on-line analytical processing (OLAP) systems. More particularly, the present invention relates to a method and system for utilizing a specific extensible markup language application program interface to enable the exchange of business intelligence information between client systems and server systems.

BACKGROUND OF THE INVENTION

The ability to act quickly and decisively in today's increasingly competitive marketplace is critical to the success of any organization. The volume of data that is available to organizations is rapidly increasing and frequently overwhelming. However, proper management and retrieval of relevant information creates a substantial advantage to the organization commonly referred to as business intelligence. The need to carve intelligent and useful information out of the large volumes of data presents various challenges. One challenge is to avoid inundating an individual with unnecessary information. Another challenge is to ensure all relevant information is available in a timely manner.

One known approach to addressing these and other challenges is known as data warehousing. Data warehouses, relational databases, and data marts are becoming important elements of many information delivery systems because they provide a central location where a reconciled version of data extracted from a wide variety of operational systems may be stored. As used herein, a data warehouse should be understood to be an informational database that stores shareable data from one or more operational databases of records, such as one or more transaction-based database systems. A data warehouse typically allows users to tap into a business's vast store of operational data to track and respond to business trends that facilitate forecasting and planning efforts. A data mart may be considered to be a type of data warehouse that focuses on a particular business segment.

Decision support systems (DSS) have been developed to efficiently retrieve selected information from data warehouses, thereby providing business intelligence information to the organization. One type of decision support system is known as an on-line analytical processing system ("OLAP"). In general, OLAP systems analyze the data from a number of different perspectives and support complex analyses against large input data sets.

In conventional OLAP systems, business intelligence queries originating from client computer systems (such as, e.g., world wide web client systems, desktop client systems, wireless client systems, etc.) interface with an OLAP application or other business intelligence server through a COM application program interface (API). More generally, conventional systems are typically built around proprietary API's and communication protocols, i.e. not only using COM-compliant interfaces. One drawback of using a proprietary protocol is that the data format is not client-independent. That is, multiple API's are needed to request and display data in various formats including the web, email, instant messaging, wireless, etc. Requiring multiple protocols adds complexity and expense to the system. Another drawback of utilizing the former proprietary protocols is the difficulty of integrating with other systems. Another drawback is the lack of a standard and the corresponding level of knowledge required to make use of one or more proprietary technologies.

Accordingly, existing OLAP systems fail to provide for a method and system for enabling the exchange of business intelligence information over a computer network through a robust and scalable methodology.

SUMMARY OF THE INVENTION

The present invention overcomes the problems noted above, and provides additional advantages, by providing for a method for exchanging information over a computer network comprising a first step of receiving a query request into at least one network server computer system, from at least one client computer system over a computer network. The query request is formatted in an extensible markup language query document according to an extensible markup language document application program interface. The extensible markup language query document is transmitted to at least one business intelligence server computer system. The at least one business intelligence server computer system receives the extensible markup language query document and retrieves corresponding information from at least one data storage device said at least one data storage device.

DETAILED DESCRIPTION OF PREFERRED EMBODIMENTS

Figure 1:
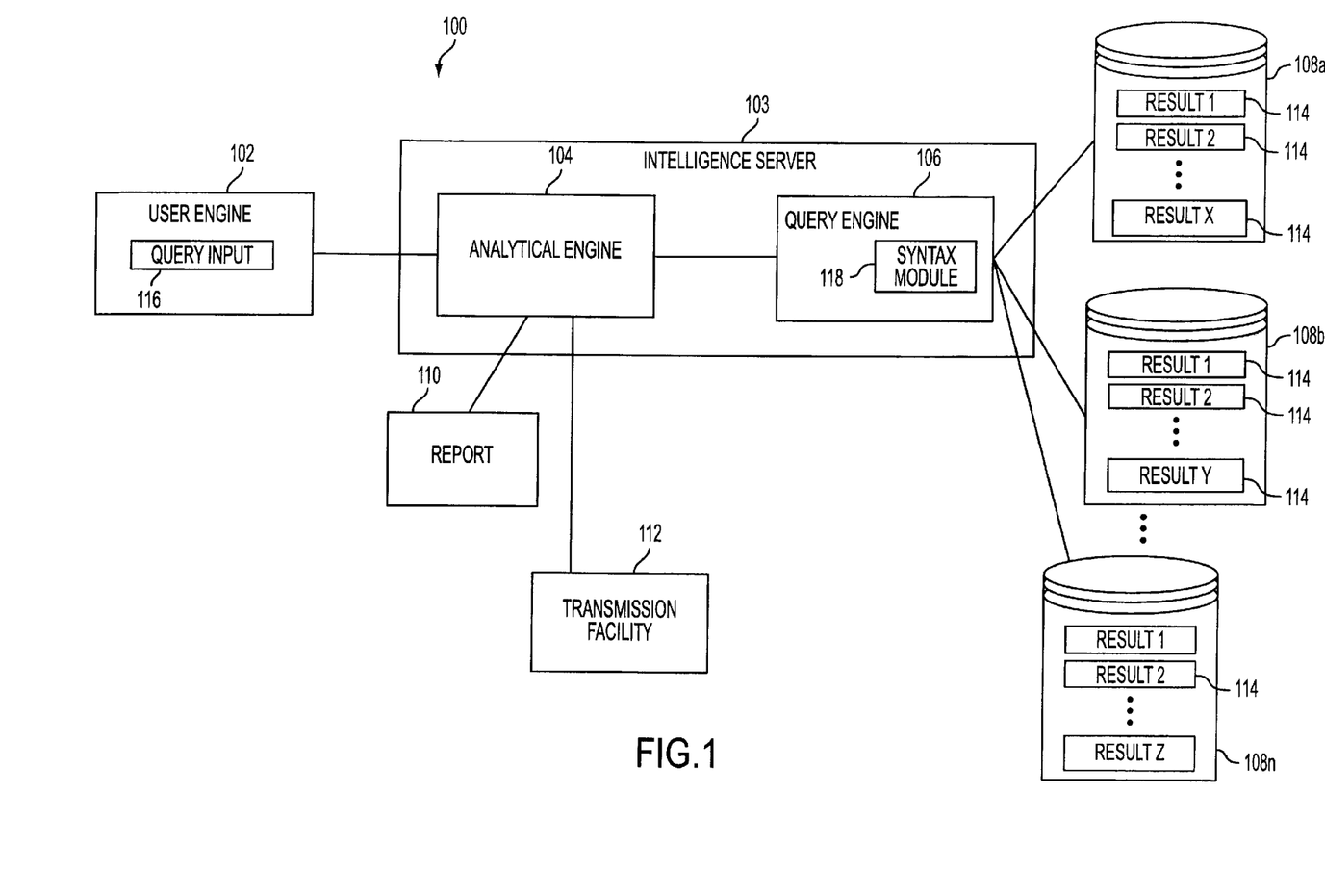
FIG. 1 is a block diagram illustrating an architecture for a system according to an embodiment of the invention.
Figure 2:
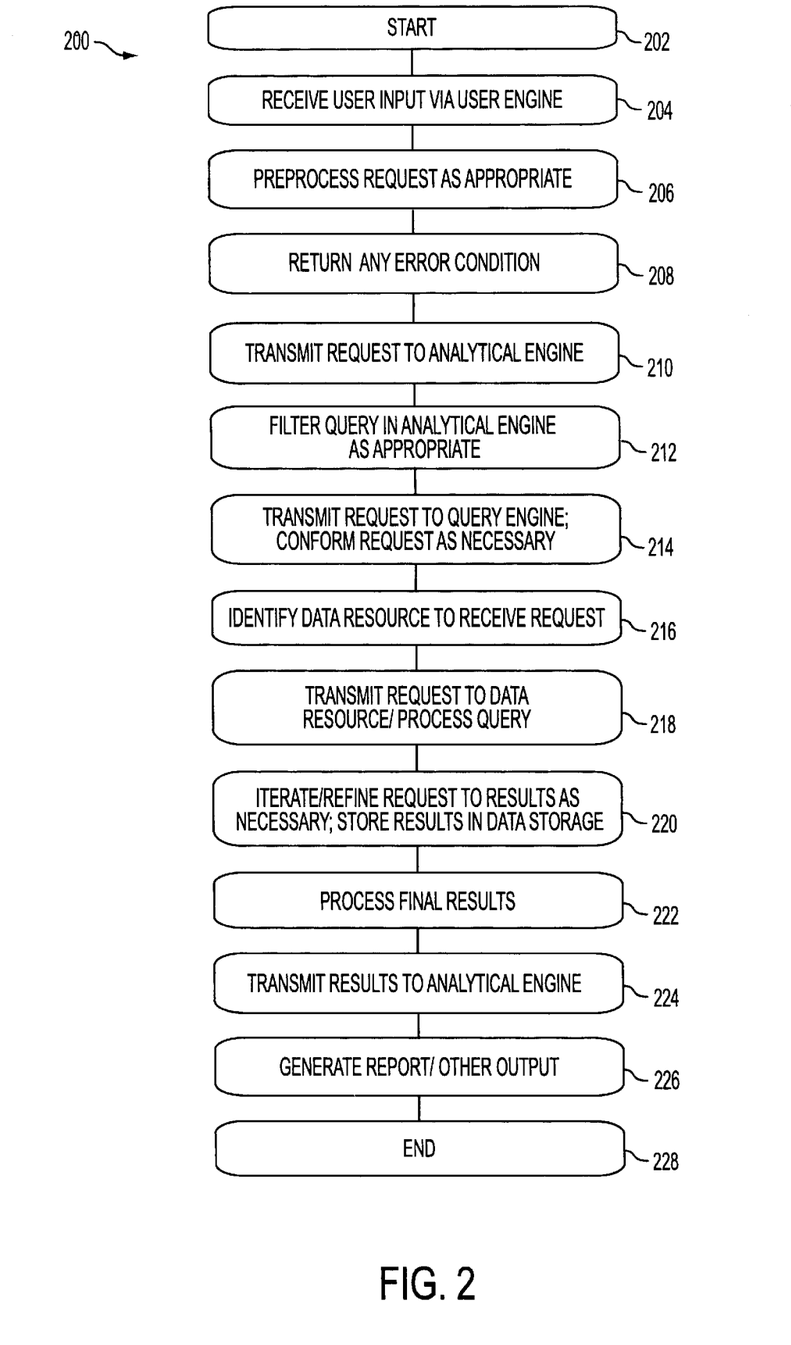
FIG. 2 is a flowchart illustrating steps performed by a process utilizing a query engine according to an embodiment of the invention.

The present invention may cooperate with a business intelligence system such as that shown in FIGS. 1 and 2.

FIG. 1 is a block diagram illustrating a system 100 by which a variety of data resources may be accessed for business analytic, report generation and other intelligence purposes according to an embodiment of the invention. According to a preferred embodiment, the system 100 may comprise an Online Analytical Processing (OLAP) decision support system (DSS). In particular, FIG. 1 may comprise a portion of the MicroStrategy 7 or 7.1 platform which provides a preferred system in which the present invention may be implemented.

In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

In addition, system 100 may enable the creation of reports or services that are processed according to a schedule. Users may then subscribe to the service, provide personalization criteria and have the information automatically delivered to the user, as described in U.S. Pat. No. 6,154,766 to Yost et al., which is commonly assigned and hereby incorporated by reference.

As illustrated in FIG. 1, a business, a government or another user may access the resources of the system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the system 100, according to a query received from the user engine 102.

The analytical engine 104 may communicate with a query engine 106, which in turn interfaces to one or more data storage devices 108a, 108b ... 108n (where n is an arbitrary number). The data storage devices 108a, 108b ... 108n may include or interface to a relational database or another structured database stored on a hard disk, an optical disk, a solid state device or another similar storage media. When implemented as databases, the data storage devices 108a, 108b ... 108n may include or interface to, for example, an Oracle™ relational database such as sold commercially by Oracle Corporation, an Informix™ database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 108a, 108b ... 108n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a Microsoft Windows™ NT™ operating system, a Windows™ 2000 operating system, a Unix operating system, a Linux operating system, a Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a MacIntosh operating system, an Apache platform, an OpenStep™ operating system, or another similar operating system or platform. According to one embodiment of the present invention, analytical engine 104 and query engine 106 may comprise elements of an intelligence server 103.

The data storage devices 108a, 108b ... 108n may be supported by a server or another resource and may, in some embodiments, include redundancy, such as a redundant array of independent disks (RAID), for data protection. The storage capacity of any one or more of the data storage devices 108a, 108b ... 108n may be of various sizes, from relatively small data sets to very large database (VLDB)-scale data sets, such as warehouses holding terabytes of data or more. The fields and types of data stored within the data storage devices 108a, 108b ... 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b ... 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b ... 108n in its original format. If so, the query engine 106 may directly transmit the query to one or more of the resources of the data storage devices 108a, 108b ... 108n for processing.

If the transmitted query cannot be processed in its original format, the query engine 106 may perform a translation of the query from an original syntax to a syntax compatible with one or more of the data storage devices 108a, 108b ... 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n ... 108n for processing. In some embodiments, the query may be processed for one or more hits against one or more databases in the data storage devices 108a, 108b ... 108n. For example, a manager of a restaurant chain, a retail vendor or another similar user may submit a query to view gross sales made by the restaurant chain or retail vendor in the State of New York for the year 1999. The data storage devices 108a, 108b ... 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b ... 108n, depending on which of the data resources produce hits from processing the search query. In some embodiments of the system 100 of the invention, the results 114 may be maintained on one or more of the data storage devices 108a, 108b ... 108n to permit one or more refinements, iterated queries, joinders or other operations to be performed on the data included in the results 114 before passing the information included in the results 114 back to the analytical engine 104 and other elements of the system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108a, 108b . . . 108n. The report 110 may be presented to the user via the user engine 102, and, in some embodiments, may be temporarily or permanently stored on the user engine 102, a client machine or elsewhere, or printed or otherwise output. In some embodiments of the system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the Narrowcaster™ platform or Telecaster™ service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 Patent, an administrative level user may create a report as part of a service. Subscribers/users may then receive access to reports through various types of of data delivery devices including telephones, pagers, PDAs, WAP protocol devices, email, facsimile, and many others. In addition, subscribers may specify trigger conditions so that the subscriber receives a report only when that condition has been satisfied, as described in detail in the '766 Patent. The platform of FIG. 1 may have many other uses, as described in detail with respect to the MicroStrategy 7 and 7.1 platform, the details of which will be appreciated by one of ordinary skill in the reporting and decision support system art.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may further process the input query as appropriate to ensure the intended results 114 may be generated to apply the desired analytics. In step 214, the query engine 106 may further filter, format and otherwise process the input query to ensure that the query is in a syntax compatible with the syntax of the data storage devices 108a, 108b . . . 108n. In step 216, one or more appropriate databases or other resources within the data storage devices 108a, 108b . . . 108n may be identified to be accessed for the given query.

In step 218, the query may be transmitted to the data storage devices 108a, 108b . . . 108n and the query may be processed for hits or other results 114 against the content of the data storage devices 108a, 108b . . . 108n. In step 220, the results 114 of the query may be refined, and intermediate or other corresponding results 114 may be stored in the data storage devices 108a, 108b . . . 108n. In step 222, the final results 114 of the processing of the query against the data storage devices 108a, 108b . . . 108n may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

Figure 3:
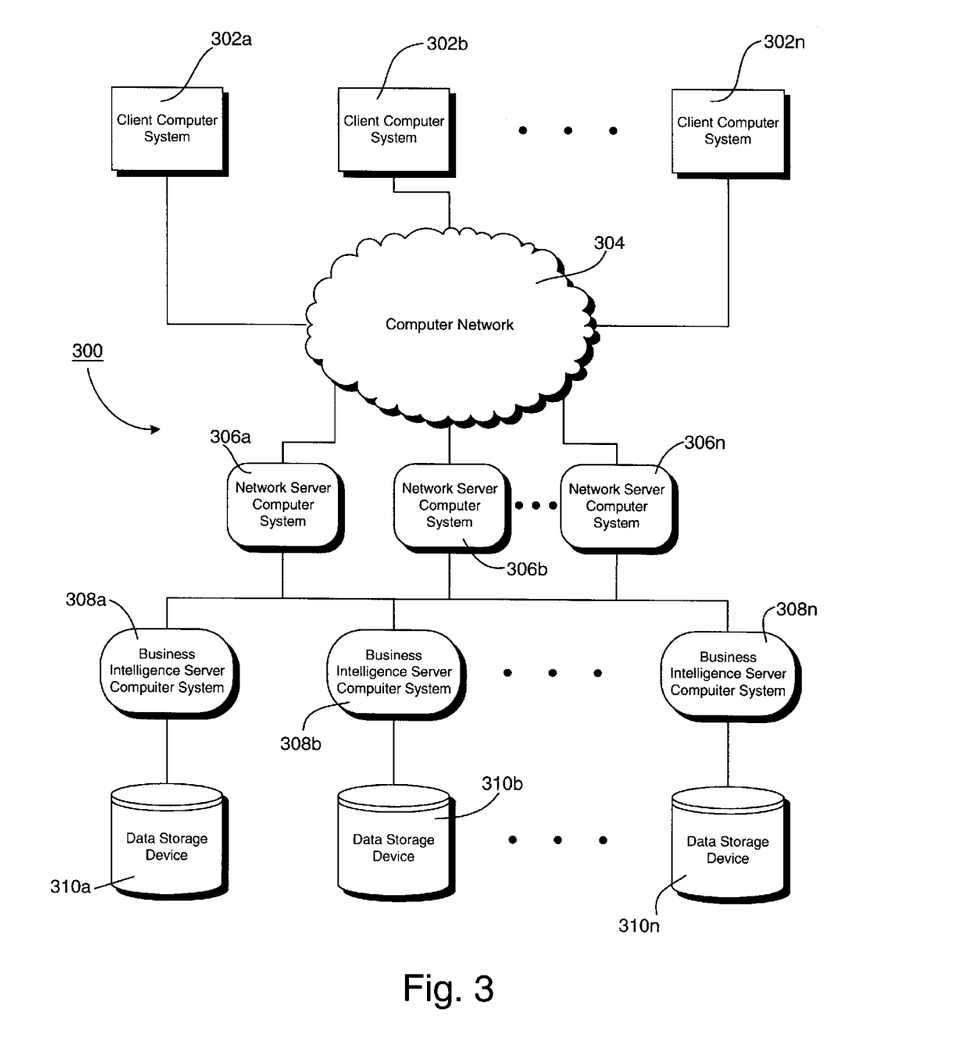
FIG. 3 is a generalized block diagram illustrating one embodiment of a system for providing business intelligence information data over a computer network.

Now referring to FIG. 3, there is shown a generalized block diagram illustrating one embodiment of a system 300 for providing business intelligence data over a computer network in accordance with the present invention. In particular, one or more client computer systems 302a, 302b . . . 302n (where n is an arbitrary number), typically executing a client browser application that supports the HTTP protocol, are connected, typically through an Internet Service Provider (ISP) to a computer network 304, such as the Internet. Further, one or more network server computer systems 306a, 306b . . . 306n (where n is an arbitrary number), executing one or more server applications are also coupled to the computer network 304 through an ISP. In one embodiment, a plurality of network server computer systems 306a, 306b . . . 306n are operatively joined together to form a server cluster, thereby improving the performance of the web server applications being executed thereon. One example of a suitable server 306 is a web server for hosting at least one web server application available over the World Wide Web. However, additional network servers are also suitable and may include email servers, instant messaging servers, and wireless content servers.

In accordance with one embodiment of the present invention, one ore more business intelligence server computer systems 308a, 308b . . . 308n are operative connected to the one or more network servers computer systems 306a, 306b . . . 306n for providing the analytical and querying functions described above in relation to the system of FIG. 1. As with the plurality of network server computer systems 306a, 306b . . . 306n, the business intelligence server computer systems 308a, 308b . . . 308n may also be operatively joined together to form a server cluster. As will be described in additional detail below, the one or more network server computer systems and the one or more business intelligence computer systems are configured to format, send and receive information utilizing a specialized transmission protocol implementing extensible markup language (XML).

Upon receiving a query request from at least one of the client computer systems, the network server application formats the request into an XML query document in the manner set forth in detail below. In one embodiment, the initially received query request comes in the form of a document created utilizing hypertext markup language (HTML) or dynamic hypertext markup language (DHMTL).

The formatted XML document is then transmitted to at least one of the business intelligence server applications residing on the business intelligence server computer systems 308. Upon receipt of a properly formatted XML query document, the business intelligence server computer system 308 may then communicate with one or more data storage devices 310a, 310b . . . 310n to retrieve the appropriate data.

Once the requested information has been retrieved, the entire process is reversed. In particular, the retrieved information is formatted into an XML results document, transmitted to the network server computer system 306, reformatting into a simple browser-executable format such as HMTL/DHTML and returned to the client computer system 302 via the computer network 304.

Figure 4:
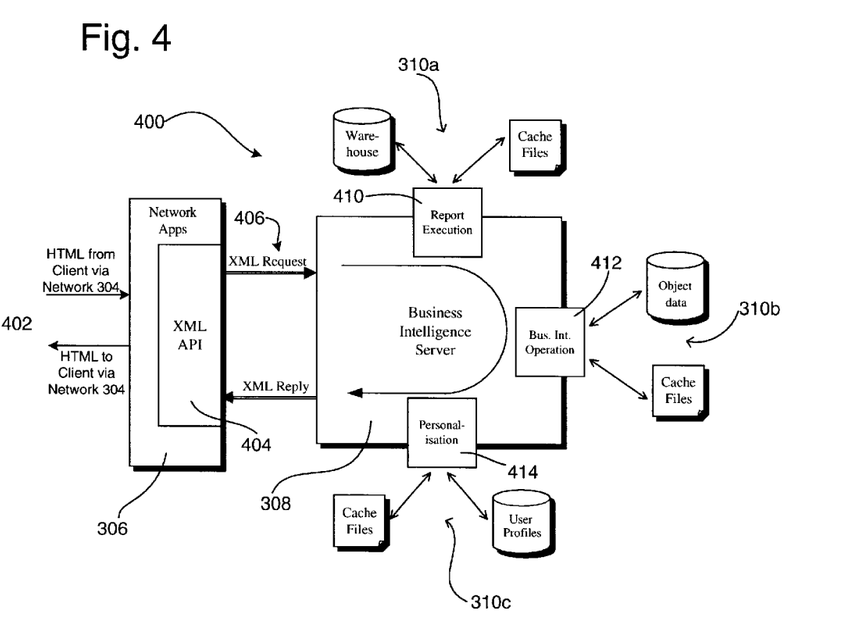
FIG. 4 is a block diagram illustrating a second architecture for a system according to an embodiment of the invention.

Turning now to FIG. 4, there is shown a block diagram 400 illustrating one embodiment of a network server computer system 306, a business intelligence server computer system 308, and a plurality of data storage devices 310a, 310b, and 310c configured in the manner described above. In this embodiment, network server computer system 306 receives conventional HTML/DHTML-formatted data 402 from a client computer system over the computer network 304. Relating specifically to business intelligence data acquisition, one exemplary request may be a search for all consumer sales by an organization's Chicago office during calendar year 1997.

In accordance with the present invention, the network server computer system 304 is configured to include an application program interface 404 (API) for translating the received HTML/DHTML request 402 into a particular format of XML. The details and specificities of the particular XML format implemented by the network server computer system 304 will be described in additional detail below in relation to FIGS. 5–6. The XML API 404 of the present invention constitutes the specific method by which the network server applications can make HTML/DHTML-based requests readable to the business intelligence server in a manner which maximizes the functionality of the entire system. By specifically prescribing the format of the interaction, the various programs are able to efficiently interface with each.

Upon receiving an HTML/DHTML request 402 from a client server computer system, the network server computer system 306 operates to apply the XML API 404 to the received request, thereby converting the HTML/DHTML request into an XML request 406 readable by the business intelligence server computer system 308 in the manner set forth in detail below. Once converted, the XML request 406 is transmitted to the business intelligence server computer system 308 for processing via a transmission protocol such as Internet Protocol (IP). As will be discussed in additional detail below, processing operations resulting from the receipt of a properly formatted XML request include report execution 410, various business intelligence operations 412, and the application of personalization filters to the requested data 414. Further, each of these operations interact with the data storage devices 310a, 310b, and 310c to retrieve any requested data.

Referring now to the specific format of the XML API utilized in the present invention, each interaction between applications comprises the exchange of at least one structured XML document conforming to the particular format imposed. Each structured XML document is composed of a series of elements, identified by nested tags. Further, the structured document also includes a unique root element for identifying the start and end of a particular document. The content of each element in a document is defined to be the text contained between a start tag <tag> and an end tag </tag> of the element. Generally, elements included within start and end tags include several types of information including: additional nested tags; pure text data, commonly referred to as "character data" or CDATA; and various attributes of the element, which typically take the form of name=value pairs and are used to described the element to which they are attached.

In addition to various tagged elements, a structured XML document formatted in accordance with the present invention also references a particular document type declaration file (DTD), which is a computer-readable file including a set of rules defining the tag guidelines for the particular XML document. In a pure sense, the structure of an XML document can be thought of as a tree, where each node denotes an element in the document, and each node connection denotes the parent-child relationship between various nodes. This type of document structure can be used as a simplified method for expressing the relationships between elements without requiring the expression of any actual character data or node attributes.

Figure 5:
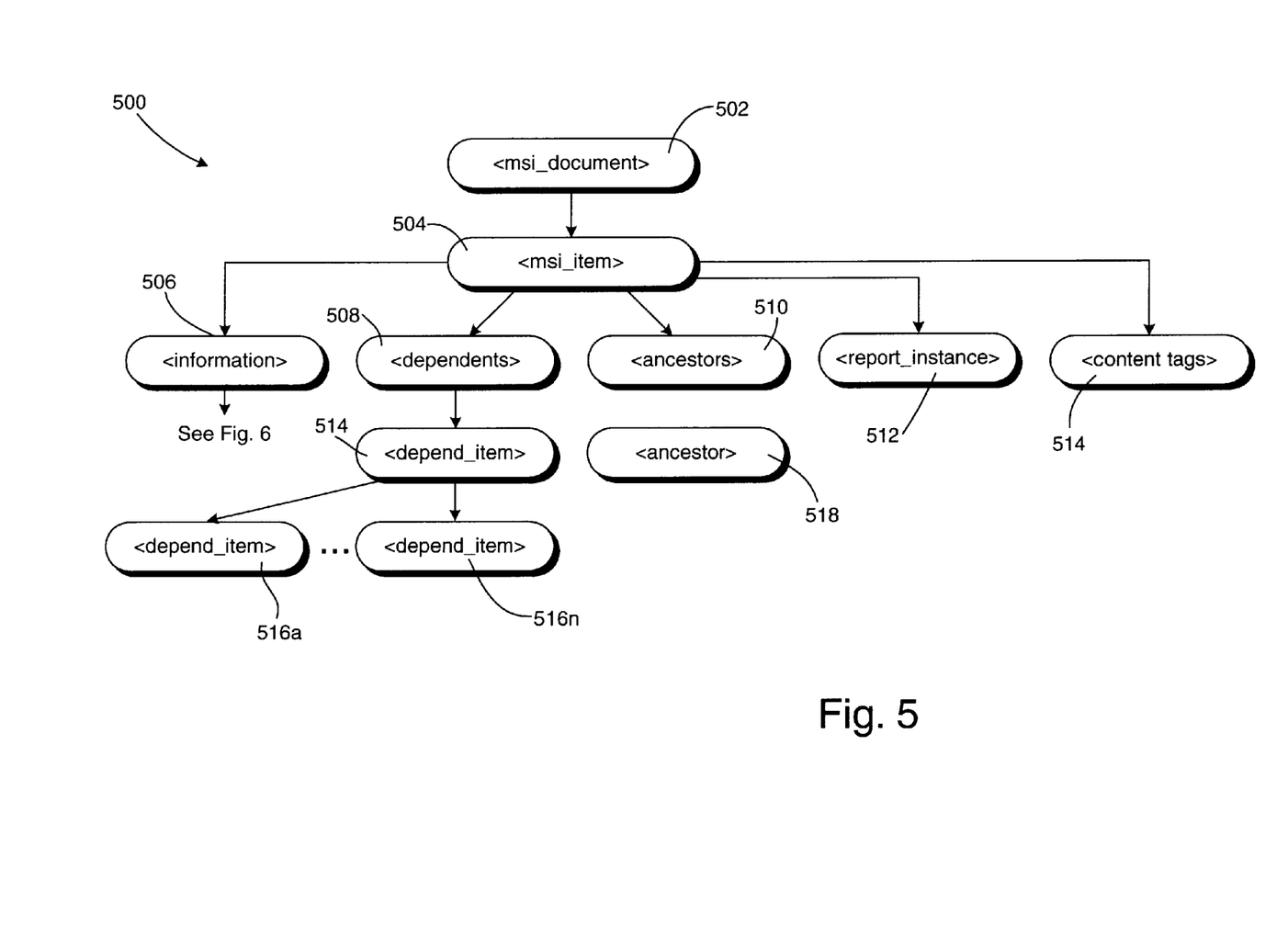
FIG. 5 illustrates an example of an XML tree structure formatted in accordance with one embodiment of the invention.

Referring now to FIG. 5, there is shown one embodiment of an XML tree structure 500 formatted in accordance with the present invention. In particular, each XML document initially contains a root element identified by as <msi_document> 502. The <msi_document> element 502 is used to mark a piece of XML as following the XML specifications of the present invention. Various sub-elements beneath the root element of a specific XML document may fall into a wide variety of different categories. For example a particular document could contain any of the following: a Report Instance Item indicating the answers to an available report query; an Object Item relating to a list of answerable queries; an Element Item relating to a pick list usable in creating a particular database query; a Document item relating to complex queries and possibly identifying multiple report items; and so on. Further, in some cases a single XML document may contain a combination of several of these items. For example a complete Report Instance Item will almost certainly contain several Object Items.

In order to distinguish clearly between different categories of items in a single XML document, a <msi_item> element 504 is implemented. Each XML file will contain at least one <msi_item> element 504. By using a <msi_item> element 504, the receiving application (either the business intelligence server 308 or the network server computer system 306) is able to accurately separate the XML documents into separate items by looking for information contained within the appropriate tags.

In order to enable applications to easily determine additional information about a particular item included within an <msi_item> element 504, several sub-elements are common to all such elements. An <information> element 506 holds information about the objects that appear within the <msi_item> tag. This element is used for two purposes: it makes it easy to find out which objects appear in the document, and when an object appears several times in the item it normalizes the supplemental information. A <dependents> element 508 is utilized to hold dependency relations between the various objects contained within the <msi_item> element 504. For example, a Folder object may contain one or more Reports within that Folder. In this case, the Reports within the Folder would be listed individually as dependents of the Folder. If, as if often the case, the item needs a list of <ancestors> elements 510 to establish its position in some hierarchy, the ancestors included therein are placed within a corresponding set of <ancestors> tags. This allows a component to render the path to the item, without giving the item itself, thereby facilitating rapid item searching.

A <report instance> element 512 holds information about a report execution action. This includes the various objects used to define the report, the answers used for prompts in the reports, SQL used to generate the reports, and the raw data returned from the data data storage devices. In addition to elements 506–512, many item-specific elements exist which are specific to the nature of the particular item and depend on the particular item within the <msi_item> tag. These content elements are represented in the Fig. by <content_tag> 514. It should be understood that not all of the common elements, (i.e., <information> elements 506; <dependent> elements 508; <ancestor> elements 510; and <report_instance> elements 512) need exist below any particular <msi_item> element 504. However, if those tags do exist, they must be present in the predefined location as described herein.

Figure 6:
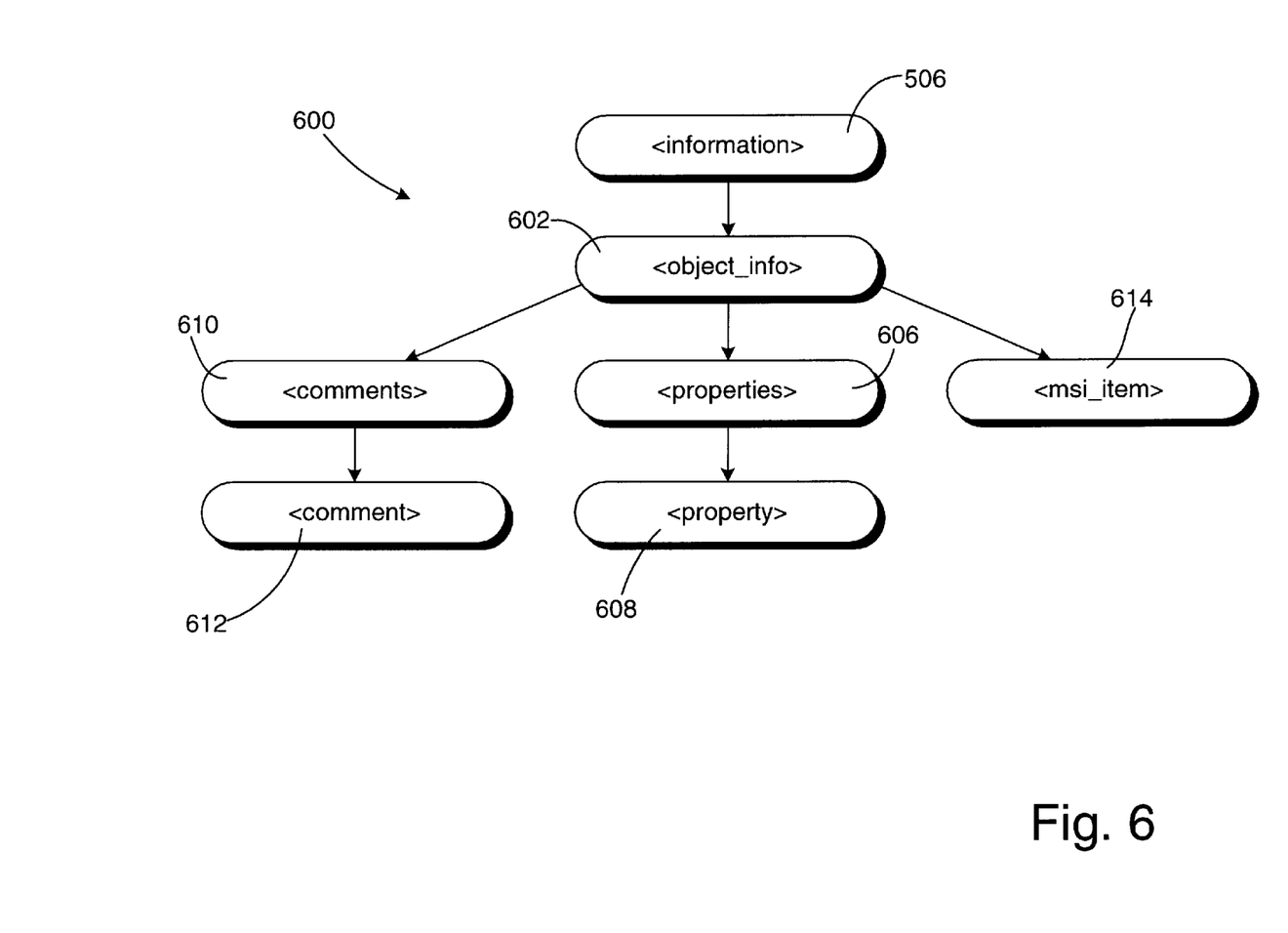
FIG. 6 illustrates an example of an XML tree structure having an <information> element as a root node.

Referring now specifically to the <information> element 506, FIG. 6 illustrates one embodiment of an XML sub-tree structure 600 formatted in accordance with the present invention. In particular, nodes beneath the <information> element 506 typically include at least one <object_info> element 602 which defines information about the object being called by the requesting application. In addition to the <object_info> element 602, other elements 604 may also be provided. Each of the <object_info> element 602 as well as any other elements provided represent some data structure that appears elsewhere within the <msi_item> element 504. Each of these nodes is preferably identified by a refid= attribute for enabling subsequent reference to the information recited therein. In particular, the refid=attribute holds a unique integer value and is used to establish cross-references between various objects within the various <information> elements 506, and elsewhere in the file. To make it easier to maintain uniqueness when merging several <msi_item> nodes into a single XML document, each <msi_item> is preferably given two attributes, a min_refid=attribute and a max_refid=attribute that together specify a range for the various refids defined within the <msi_item> element 504.

The <object_info> elements 602, are the most common type of elements contained beneath the <information> element 506 and are used to define type independent information about a particular decision support system (DSS) object within the item. Generally speaking, in a decision support system, there are several object types. The DSS system utilized with the present invention, includes such object types as Folders, Reports, Documents, Templates, etc. The <information> element for each object includes information that is common across all object types; for example, all Reports, Documents, Folders, etc. have a Name, a Description, a Creation Time, etc. All the information that is specific to a particular type in contained under the various content tags. For example, Reports have rows and columns, but Folders do not. So row- and column-related tags would appear in a Report, but not a Folder. The <object_info> element 602 typically references at least one attribute and further includes a plurality of possible subnodes relating to a plurality of object properties, as well as comments related to the particular object. A <properties> element 606 and associated <property> sub-elements 608 define particular properties and groups of properties of the particular DSS object being defined. Each of these properties are user-defined. In this case, the user who defines these properties is the person who builds the DSS application. For example, some applications may want to identify a folder as a "My Favorite Reports" folder. They would use these properties to indicate that a particular folder is the My Favorite Reports folder. Preferably, the values and information related to these properties are defined through a series of specific attributes including a property_set=attribute, a name= attribute, a data_type=attribute, and a value=attribute. In a similar manner, a <comments> element 610 and associated <comment> sub-elements 612 define any comments that are associated with a DSS object.

If a particular XML document wants to contain more information about the DSS object than is contained in the <object_info> element 602, then an additional <msi_item> element 614 is used beneath the particular <object_info> element 602. As shown in FIG. 6, the new <msi_item> element 614 appears below the <object_info> element 602. In addition, the <msi_item> element 614 may also appear in the main part of the surrounding item, that is, outside of the <object_info> element 602. The appearance of the second item distinguishes between object reference (e.g., id, name, description, etc.) and object containment (e.g., an item, which has the content or definition of another object.). If the second <msi_item> element 614 is itself a DSS object, then it also has an <object_info> element of its own (not shown) within its <information> sub-element.

Each <object_info> element 602 may include a plurality of attributes indicated the properties associated with the particular object. An abbreviation=attribute defines a string used as an abbreviated name for the object. A creation_time=attribute defines the time when the particular object was created in a local specific format. A description= attribute defines a string used as a description of the object. A dss_id=attribute defines an ObjectID string assigned to this object by the business intelligence server 308. Further, the dss_id=attribute is used to identify the DSS object in the data storage devices 310. In one preferred embodiment, the values assigned to the dss_id=attribute consist of 32 upper-case hexadecimal digits.

An id=attribute defines a local identification number assigned to the particular DSS object. This number is used to identify the object within the entire XML document (i.e., within the <msi_document> element 502. In a preferred embodiment, the value assigned to this attribute is a small positive integer of the form "R"+a unique number. An example would be "R45". A modification_time=attribute defines the time the particular object was last modified in a local specific format. A name=attribute defines a string used as the name of the particular object. A type=attribute defines a number from the DSSObjectIfnfo_Type enumeration and is used to assign a general type to the particular object. A version=attribute defines a VersionID string used to identify a specific version of the object. It should be understood that, although a combination of all attributes may be found within a particular XML file, usually only a subset of the attributes are present in any particular file, in order to keep the file as small as possible.

Returning now to the <dependents> element 508 defined above, the <dependents> element is used to describe a dependency relationship between items listed in the <msi_document> 502. Every relationship listed under the <dependents> tag relates the various items located under the <information> 506 section described above. A <depend_item> sub-element 514 includes a refid=attribute, that defines a small unique (within the scope of the <msi_document>) identifier. This id is associated with an item described under the <information> tag. Additional <depend_item> sub-elements 516a . . . 516n may be utilized to describe additional relationships defined in the <information> element.

Returning now to the <ancestors> element 510 defined above, the <ancestors> element 510 is used to list items which have a parent-child relationship in at least one corresponding <ancestor> sub-element 518. Two examples of objects with a parent-child relationship are folders and elements. Since the relationships being expressed are identical, there is merit in having a uniform way of describing those relationships. Each ancestor is listed, along with its refid=attribute and collection of item specific tags, such as a <folder> tag. For instance, if the item is a folder, the ancestors will also be folders.

Figure 7:
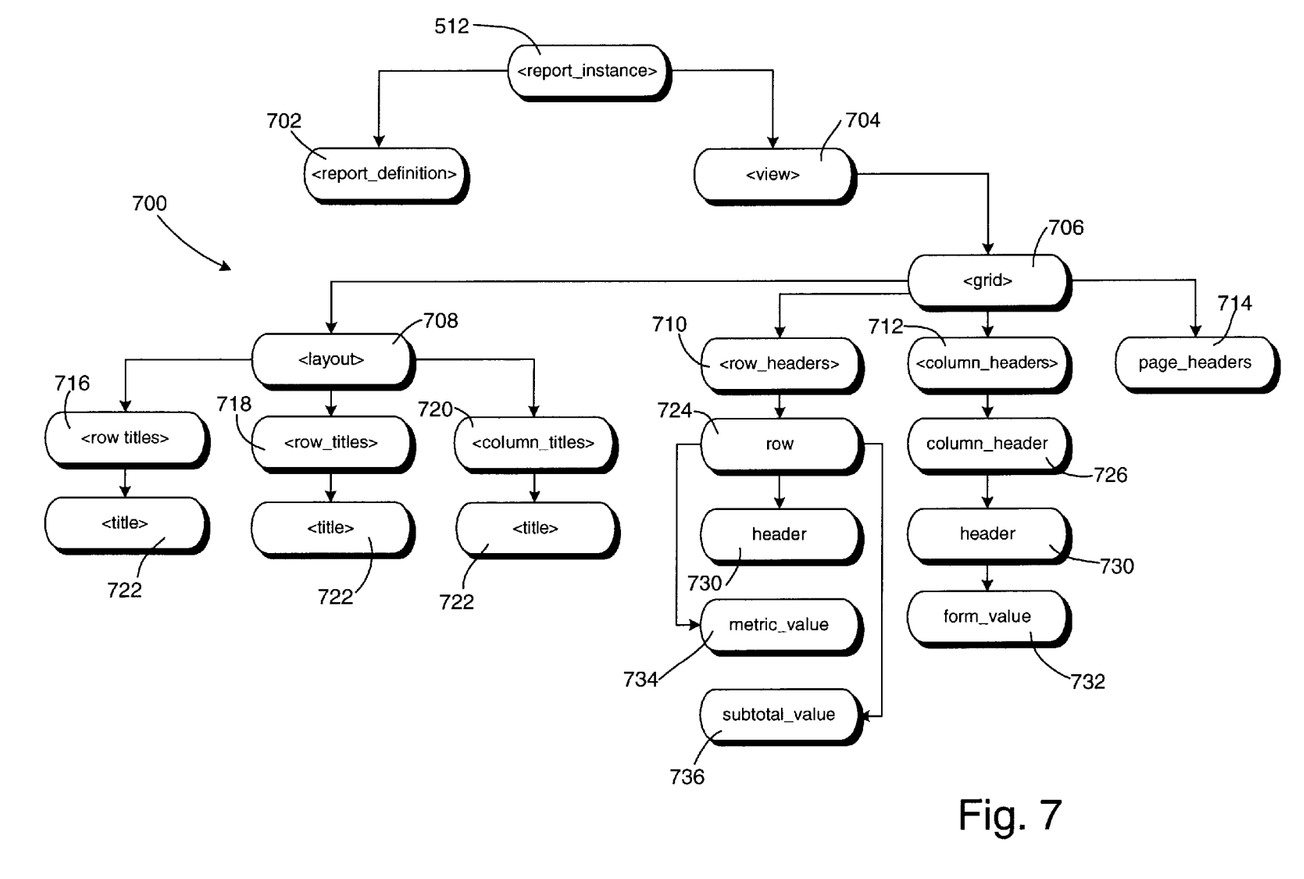
FIG. 7 illustrates an example of an XML document formatted in accordance with an embodiment of the present invention.

Referring now specifically to the <report_instance> element 512, FIG. 7 illustrates one embodiment of an XML sub-tree structure 700 formatted in accordance with the present invention. In particular, nodes beneath the <report_instance> element 512 typically include at least one <report_definition> element 702 which is used to define the report as a whole, and at least one <view> element 704 which contains a single view of the data being presented. Relating specifically to the <view> element 704, several subnodes are provided for specifically defining particular representations of the data. In particular, at least one <grid> element 706 is provided for defining the individual grids of data for display.

The <grid> element 706 further includes a plurality of subnodes such as a <layout> element 708, a <row_headers> element 710, a <column_headers> element 712, and a <page_headers> element 714. The <layout> element 708 includes information relating to the template units for each axis of the grid. In particular, a plurality of subnodes thereunder are provided for defining the various titles for the grid axes, such as a <row_titles> element 716, a <column_titles> element 718, and a <page_titles> element 720. Each of the elements 716–720 include <title> elements 722 thereunder corresponding to a template unit for the grid.

Relating to the <row_headers> element 710, each element includes a <row> sub-element 724 for each row in the grid, where a row is simply a list of header cells followed by value cells. The <column_headers> element 712 includes <column_header> elements 726 for each column in the grid. Also, the <page_headers> element 714 includes the page axis information for the particular grid of data. Further, each <row> element 724 and <column_header> element 726 also includes at least one <header> element 730 defining the actual contents of the individual header cells in the grid. Also, a <form_value> sub-element 732 is found under each <header> element to define the form of the cell value (e.g., string, number, date, URL, image, etc.) Additionally, <row> elements 724 may also include <metric_value> and <subtotal_value> sub-elements 734 and 736 for defining the type of data which appears within the particular row.

Referring now to FIG. 8, there is shown example of a structured XML document constructed in accordance with the present invention. The Example of FIG. 8 primarily illustrates an XML representation for a Folder object, defined in accordance with the present invention. Initially, the document indicates that it refers to 13 items. The main item is a Folder (object type #8) called "Web Demo," but there are also 4 other Folders, 7 Reports (object type #3), and one more Folder. The Web Demo folder is nested within a recursive nest of folders, as described by the <ancestor> tags and having the path of \CASTOR_DEMO1\App Objects\TESTER\Reports. Further, this Web Demo folder contains 7 reports beginning with "1: Region Dept (Row) and Sales (Column)" and ending with "7: Big Report". Finally, this Web Demo folder also contains another folder called "Included Folder". Using this XML representation, an application such as a web application could present the contents of the folder to a user, who might select one of the reports to run, or who might choose to explore a folder higher or lower in the hierarchy of folders.

By providing a format for XML interaction between the network server computer system 306 and the business intelligence server computer system 308, the present invention enables increased functionality to the overall system by provide a structure upon which additional applications may easily be added. In addition, XML interchange requires reduced memory and processor. Further, the use of a uniform XML standard in accordance with the present invention enables data to be more easily transmitted or otherwise broadcast through services such as the Narrowcaster™ platform or Telecaster™ service sold by MicroStrategy Incorporated and described briefly above.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

We claim:

1. A method for exchanging information over a computer network comprising the steps of:

receiving, into at least one network server computer system, a query request from at least one client computer system over a computer network;

formatting the query request into an extensible markup language query document according to an extensible markup language document application program interface, wherein the extensible markup language query document references a document type declaration, wherein the document type declaration is a set of rules defining the guidelines for the extensible markup language query document;

transmitting the extensible markup language query document to at least one business intelligence server computer system;

storing on the at least one business intelligence server computer system a copy of a document type declaration file including the referenced document type declaration;

receiving, into the at least one business intelligence server computer system, the extensible markup language query document;

retrieving information requested in the extensible markup language query document from at least one data storage device;

formatting the retrieved information into an extensible markup language results document;

transmitting the extensible markup language results document to the at least one network server computer system;

storing on the at least one network server computer system a copy of a document type declaration file including the referenced document type declaration;

formatting the extensible markup language results document into an browser-executable results document that references the document type declaration; and transmitting the browser-executable results document to the at least one client computer system over the computer network.

2. The method of claim 1, wherein the at least one network server computer system comprises a cluster of network server computer systems configured to operate jointly.

3. The method of claim 1, wherein the at least one business intelligence server system comprises a cluster of business intelligence server computer systems configured to operate jointly.

4. The method of claim 1, wherein the computer network is the Internet.

5. The method of claim 1, wherein the step of formatting the query request into an extensible markup language query document according to an extensible markup language document application program interface further comprises the step of:

formatting the query request into a document having a plurality of nested elements, wherein the plurality of nested elements define relationships for information contained within the query.

6. The method of claim 1, further comprising the steps of:

formatting the query request to include a root level element; and formatting the query request to include at least one item level element nested within the root level element, wherein the at least one item level element relates to data requested within the query request.

7. The method of claim 6, further comprising the steps of:

formatting the query request to include at least one information level element nested within at least one of the at least one item level element, wherein the at least one information level elements relates to objects requested within the query request.

8. A system for exchanging information over a computer network comprising:

at least one network server computer system for receiving a query request from at least one client computer system over a computer network, the at least one network server computer system formatting the query request into an extensible markup language query document according to an extensible markup language document application program interface, formatting the extensible markup language results document into an browser-executable results document that references a document type declaration, wherein the document type declaration is a set of rules defining the guidelines for the extensible markup language query document, transmitting the browser-executable results document to the at least one client computer system over the computer network, and storing a copy of a document type declaration file including the referenced document type declaration; and;

at least one business intelligence server computer system for receiving the extensible markup language query document from the at least one network server computer system, formatting the information into an extensible markup language results document that references the document type declaration, storing a copy of a document type declaration file including the referenced document type declaration, and transmitting the extensible markup language results document to the at least one network server computer system;

at least one data storage device for storing information requested in the extensible markup language query document, wherein the at least one business intelligence server computer system retrieves the information requested in the extensible markup language query document from the at least one data storage device.

9. The system of claim 8, wherein the at least one network server computer system comprises a cluster of network server computer systems configured to operate jointly.

10. The system of claim 8, wherein the at least one business intelligence server system comprises a cluster of business intelligence server computer systems configured to 1 0 operate jointly.

11. The system of claim 8, wherein the computer network is the Internet.

12. The system of claim 8, wherein:

the at least one network server computer system formats the query request into a document having a plurality of nested elements, wherein the plurality of nested elements define relationships for information contained within the query.

13. The method of claim 8, wherein:

the at least one network server computer system formats the query request to include a root level element; and the at least one network server computer system formats the query request to include at least one item level element nested within the root level element, wherein the item level element relates to data requested within the query request.

14. The system of claim 13, wherein:

the at least one network server computer system formats formatting the query request to include at least one information level element nested within at least one of the at least one item level element, wherein the at least one information level elements relates to objects requested within the query request.

\* \* \* \* \*

UNITED STATES PATENT AND TRADEMARK OFFICE
CERTIFICATE OF CORRECTION

PATENT NO.    : 6,704,723 B1
DATED         : March 9, 2004
INVENTOR(S)   : Ali Alavi et al.

It is certified that error appears in the above-identified patent and that said Letters Patent is hereby corrected as shown below:

Column 13,
Line 2, change "an browser-executable" to -- a browser-executable --;
Line 3, change "the" to -- a --;
Line 48, change "an" to -- a --;

Column 14,
Line 10, change "the document type declaration" to -- a document type declaration --.

Signed and Sealed this

Twenty-second Day of June, 2004

JON W. DUDAS
*Acting Director of the United States Patent and Trademark Office*